US009582381B2

(12) United States Patent
Malnati et al.

(10) Patent No.: US 9,582,381 B2
(45) Date of Patent: Feb. 28, 2017

(54) MULTI-THREADED SERVER CONTROL AUTOMATION FOR DISASTER RECOVERY

(71) Applicants: James R Malnati, Stillwater, MN (US); Robert Jamieson, Kuala Lumpur (MY)

(72) Inventors: James R Malnati, Stillwater, MN (US); Robert Jamieson, Kuala Lumpur (MY)

(73) Assignee: Unisys Corporation, Blue Bell, PA (US)

( * ) Notice: Subject to any disclaimer, the term of this patent is extended or adjusted under 35 U.S.C. 154(b) by 114 days.

(21) Appl. No.: 14/302,851

(22) Filed: Jun. 12, 2014

(65) Prior Publication Data

US 2015/0363283 A1    Dec. 17, 2015

(51) Int. Cl.
*G06F 11/00* (2006.01)
*G06F 11/20* (2006.01)
*G06F 11/14* (2006.01)

(52) U.S. Cl.
CPC ........ *G06F 11/2035* (2013.01); *G06F 11/142* (2013.01); *G06F 11/2023* (2013.01); *G06F 11/1417* (2013.01)

(58) Field of Classification Search
CPC . G06F 11/2035; G06F 11/2236; G06F 11/267
See application file for complete search history.

(56) References Cited

U.S. PATENT DOCUMENTS

| | | | | |
|---|---|---|---|---|
| 6,405,294 B1* | 6/2002 | Hayter | ................. | G06F 3/0601 711/162 |
| 7,409,577 B2* | 8/2008 | Wing | ................. | G06F 11/2025 703/21 |
| 8,135,985 B2* | 3/2012 | Mishra | ................ | G06F 11/1438 714/13 |
| 8,234,515 B2* | 7/2012 | Collier | ................ | G06F 11/2097 714/1 |
| 8,984,325 B2* | 3/2015 | Garai | ................. | G06F 11/2038 714/1 |
| 9,154,366 B1* | 10/2015 | Martin | ............... | H04L 29/08072 |
| 2011/0141882 A1* | 6/2011 | Rieschl | ............... | G06F 11/2025 370/221 |
| 2012/0151273 A1* | 6/2012 | Ben Or | ............... | G06F 9/45533 714/41 |
| 2013/0173859 A1* | 7/2013 | Gorrell | ................. | G06F 3/0617 711/112 |

* cited by examiner

*Primary Examiner* — Joseph Kudirka
(74) *Attorney, Agent, or Firm* — Robert P. Marley (57) ABSTRACT

Systems and methods for multi-threaded server control automation for disaster recovery are described. A method may include initiating a disaster recovery sequence on two or more processors, wherein the disaster recovery sequence comprises a plurality of subsequences. The method may also include implementing the disaster recovery sequence on the two or more processors in parallel, wherein one or more subsequences of the disaster recovery sequence are implemented on the two or more processors in parallel. Upon completion of the disaster recovery sequence, at least one server partition is repurposed from a first configuration, such as a test configuration, to a second configuration, such as a production configuration.

11 Claims, 8 Drawing Sheets

| Application | Partition | Activate | Start | Running | SYSFIN |
|---|---|---|---|---|---|
| CRS | D28DR2 | ○ | ○ | ○ | ○ |
| | D38DR2 | ○ | ○ | ○ | ○ |
| ICS | D28DR1 | ○ | ○ | ○ | ○ |
| | D38DR1 | ○ | ○ | ○ | ○ |
| DCS | D28DR3 | ○ | ○ | ○ | ○ |
| TST | D38083 | ○ | ○ | ○ | ○ |

*Server Control Automation*

MULTI-THREADED SERVER CONTROL AUTOMATION FOR DISASTER RECOVERY

FIELD OF THE DISCLOSURE

The instant disclosure relates to computer systems. More specifically, this disclosure relates to multi-threaded server control automation for disaster recovery in computer systems.

BACKGROUND

Computer systems have become backbones of companies throughout the world. Even if a company does not provide products or services over the internet, computer systems within the company improve employee productivity by providing employees with instantaneous access to millions of bytes of data. In fact, many companies are unable to function when the company's computer systems fail. Thus, it is imperative that companies have reliable computer systems with 99.999% up time.

Conventionally, a computer system may be provided with additional resiliency to failures by having a disaster recovery (DR) plan. That is, when a failure in the computer system occurs, a plan is available to quickly bring the computer system back to functional status. Disaster recovery plans may include actions taken by one or more actors. For example, a recovery plan may include switching to backup systems at the location of the failure or may include switching to backup systems at a location remote from the site of the failure.

To improve response to disaster events within the computer system, control over servers and partitions within a computer system may be automated. This may be referred to as Server Control Automation (SCA). SCA may be executed on one or several control systems. Conventional systems may include many server partitions that are spread across multiple service processor (SP) instances. However, due to the nature of server control, only a single partition may be acted upon for each SP using SCA. As a result, a significant amount of time elapses for recovery and preparation of multiple server partitions.

SUMMARY

The time consumed to recover and prepare multiple server partitions may be reduced with multi-threaded SCA. For example, a computer system with multi-threaded SCA may repurpose multiple server partitions so that partitions originally configured for purposes other than production purposes may be configured for production purposes. When the recovery time is reduced, a company may resume business production quicker and thus reduce loss to the company.

According to one embodiment, a method may include initiating a disaster recovery sequence on two or more processors, wherein the disaster recovery sequence comprises a plurality of subsequences. The method may further include implementing the disaster recovery sequence on the two or more processors in parallel, wherein one or more subsequences of the disaster recovery sequence are implemented on the two or more processors in parallel, wherein the step of implementing the disaster recovery sequence comprises repurposing at least one server partition from a first configuration to a second configuration upon completion of the disaster recovery sequence.

According to another embodiment, a computer program product may include a non-transitory computer-readable medium comprising code to perform the step of initiating a disaster recovery sequence on two or more processors, wherein the disaster recovery sequence comprises a plurality of subsequences. The medium may also include code to perform the step of implementing the disaster recovery sequence on the two or more processors in parallel, wherein one or more subsequences of the disaster recovery sequence are implemented on the two or more processors in parallel, wherein at least one server partition is repurposed from a first configuration to a second configuration upon completion of the disaster recovery sequence.

According to yet another embodiment, an apparatus may include a memory, and a processor coupled to the memory. The processor may be configured to execute the step of initiating a disaster recovery sequence on two or more processors, wherein the disaster recovery sequence comprises a plurality of subsequences. The processor may also be configured to execute the step of implementing the disaster recovery sequence on the two or more processors in parallel, wherein one or more subsequences of the disaster recovery sequence are implemented on the two or more processors in parallel, wherein at least one server partition is repurposed from a first configuration to a second configuration upon completion of the disaster recovery sequence.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Computer systems may include many server partitions. Different server partitions may be used for different purposes, such as, for example, for development, testing, and/or production purposes. According to an embodiment, server partitions may be housed in remote, unstaffed locations and/or in buildings in which company employees are staffed. Server partitioning information that specifies the configuration of server partitions may reside in one or more server partitions (SPs). In one embodiment, when a disaster occurs or server partitions become inoperable for other reasons, multi-threaded Server Control Automation (SCA) may be used to automatically access and control one or more SPs to repurpose partitions configured for purposes other than production purposes for production usage. For example, multi-threaded SCA may access the SPs to initiate a disaster recovery (DR) sequence that automatically repurposes partitions so that the partitions transition from being configured for other purposes, such as development and/or testing purposes, to being configured for production purposes. In some embodiments, this process may ensure that production partitions are restored after a disaster event in less time than when manual interaction is necessary. According to an embodiment, Software Development Kit (SDK) libraries and interfaces may be used to implement multi-threaded SCA.

In some embodiments, multi-threaded SCA may also set system Jump Keys, establish boot device types, e.g., disk or tape, and/or specify boot volume information. Depending on the partition, different combinations of operations may be performed. Jump keys are initial configuration settings in Server Control that manage system boot startup and post-boot conditions. For example, Jump Key 3 may inhibits boot auto-recovery by the system when a crash occurs. If Jump Key 3 is not set the system will auto-recover, which may not be desirable if a new Boot Volume is to be specified. Boot Volume Load information specifies the type of device (disk or tape) on which the initial boot image may be found. As the initial bootstrap of the system progresses, this boot information is processed and establishes the early conditions into which the system loads itself. Boot Volumes may reside on either disk or tape media, and the Boot Volume Load information specifies the exact location of the Boot Volume as well as its type.

In view of systems to be shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, the methodologies disclosed throughout this specification are capable of being embodied, for example in computer program code, stored on an article of manufacture, such as a non-transitory computer readable medium, to facilitate transporting and transferring such methodologies to various devices. The methodologies described herein could alternatively be represented as a series of interrelated states or events, such as in a state diagram.

Figure 1:
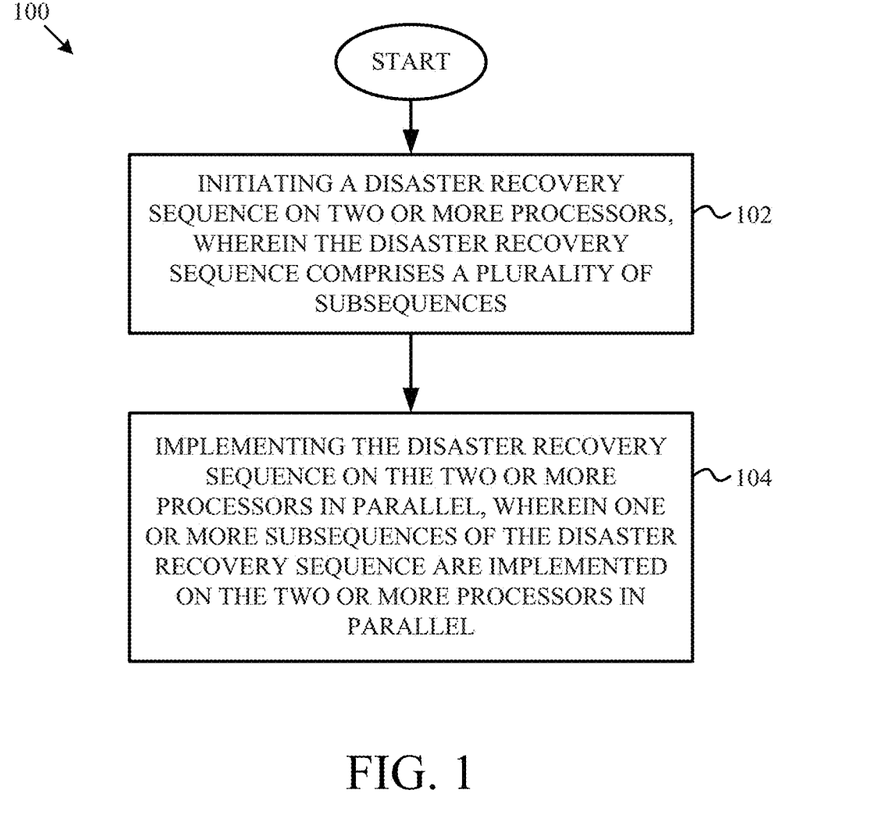
FIG. 1 is a flow chart illustrating a method for multi-threaded SCA for DR according to one embodiment of the disclosure.
Figure 2:
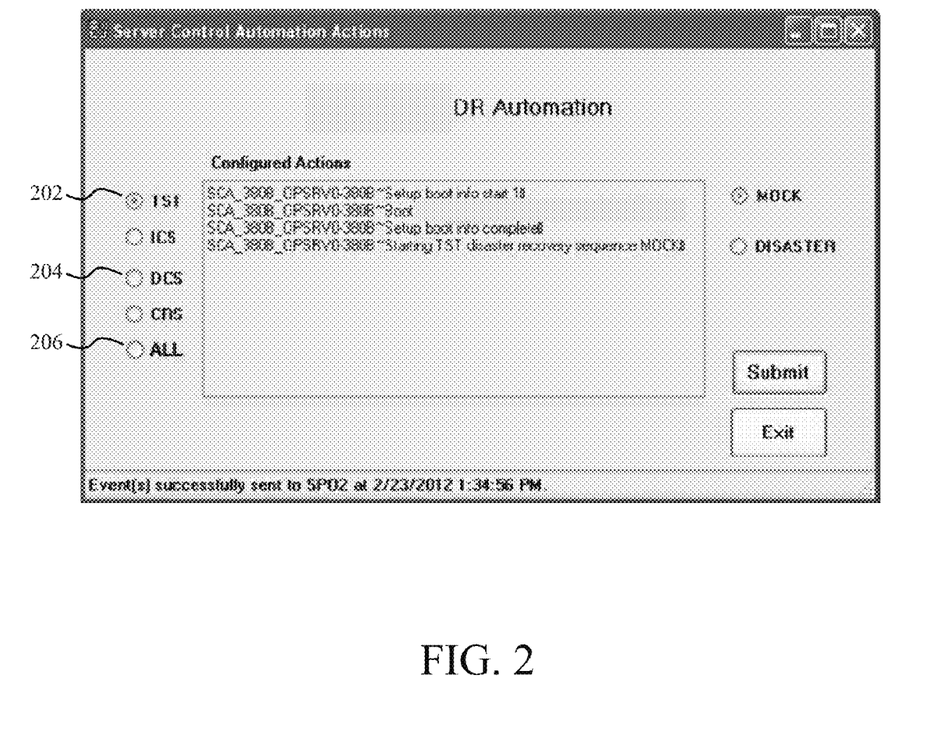
FIG. 2 is a screen shot illustrating an interface for receiving input according to one embodiment of the disclosure.

FIG. 1 is a flow chart illustrating a method 100 for multi-threaded SCA for DR according to one embodiment of the disclosure. A method 100 begins at block 102 with initiating a DR sequence on two or more processors, such as SPs, wherein the DR sequence includes a plurality of subsequences. In some embodiments, the DR sequence may be initiated on one or more processors. According to one embodiment, the DR sequence may be automatically initiated by a computer or other processing device upon detecting a disaster event. According to another embodiment, input may be received on a user interface to initiate the DR sequence. For example, FIG. 2 provides a screen shot illustrating an interface for receiving input according to one embodiment of the disclosure. As shown in FIG. 2, the TST application partition may be selected to implement the DR sequence by selecting the TST radio button 202. According to another embodiment, multiple application partitions, such as those associated with the TST and DCS applications, may be selected to implement the DR sequence in parallel by selecting the TST radio button 202 and the DCS radio button 204. In still another embodiment, all listed application partitions may be selected to implement the DR sequence in parallel by selecting the "ALL" radio button 206.

In some embodiments, the processor on which the user interface runs may be a different processor than the two or more processors on which the DR sequence is initiated. For example, the processor on which the user interface runs may be a local processor located at the disaster location while the two or more processors on which the DR sequence is initiated may be remote processors. According to another embodiment, the processor on which the user interface runs may not be located at the disaster location but may still be a different processor than the two or more processors on which the DR sequence is initiated. In another embodiment, the processor on which the user interface runs may be at least one of the two or more processors on which the DR sequence is initiated. In some embodiments, although a single Service Processor may only recover one partition at a time (it is single-threaded), many systems may comprise multiple partitions on multiple Service Processors. Such configurations may be capable of multi-threaded SCA.

Referring back to FIG. 1, method 100 includes, at block 104, implementing the DR sequence on two or more processors in parallel, wherein one or more subsequences of the DR sequence are implemented on the two or more processors in parallel. In some embodiments, for example, the DR sequence may include at least a first subsequence for stopping a partition, a second subsequence for deactivating a partition, a third subsequence for activating a partition, a fourth subsequence for starting a partition, and a fifth subsequence for booting a partition. According to an embodiment, upon completion of the disaster recovery sequence, at least one server partition may be repurposed from a first configuration to a second configuration. In some embodiments, the first configuration may include a development and/or testing configuration and the second configuration may include a production configuration.

Figure 3:
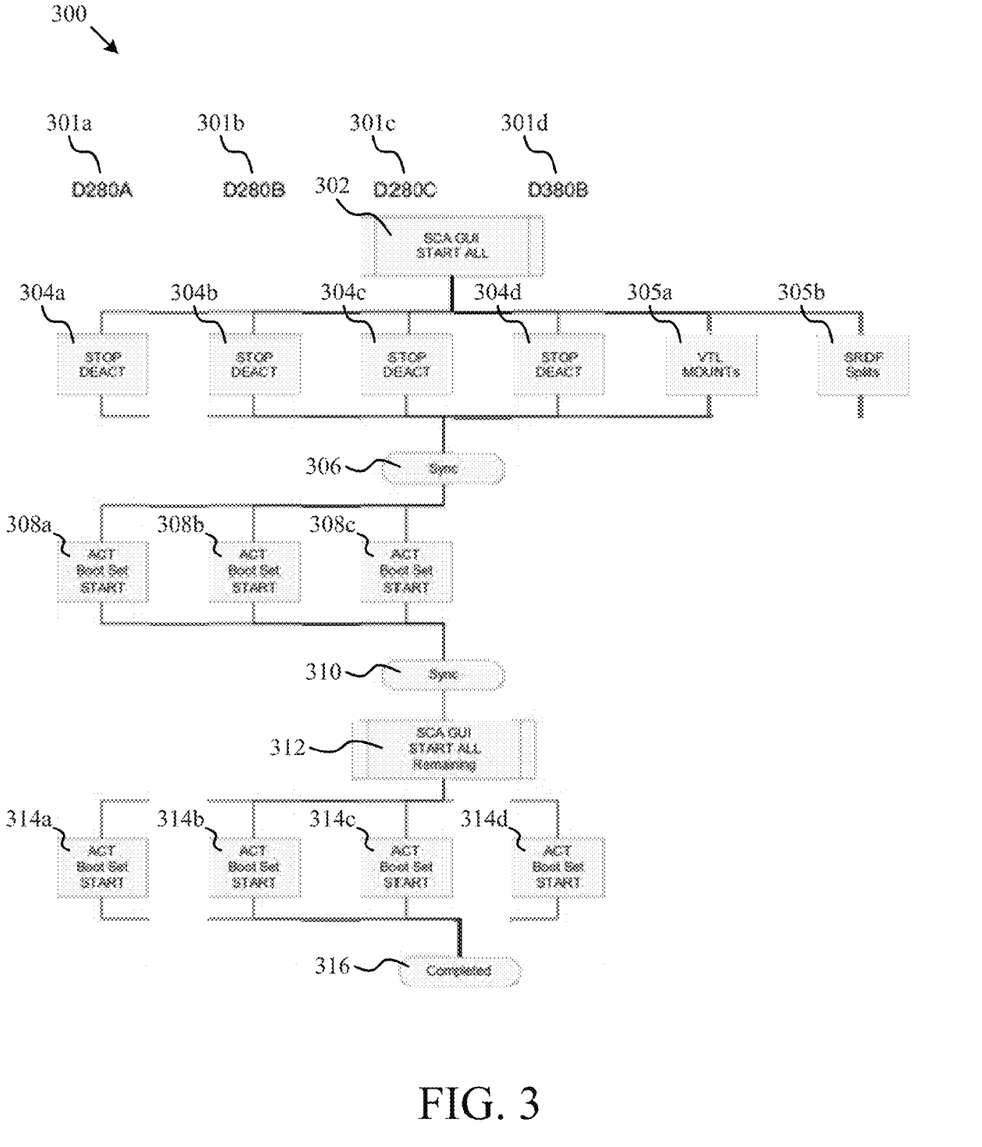
FIG. 3 is a diagram illustrating a DR sequence implemented using multi-threaded SCA according to one embodiment of the disclosure.

As an example of a DR sequence implemented on two or more processors in parallel, FIG. 3 provides a diagram illustrating a DR sequence 300 implemented using multi-threaded SCA according to one embodiment of the disclosure. According to the embodiment of FIG. 3, four partitions 301a-301d may be acted upon in parallel. At block 302, an interface for receiving input may be presented and all four partitions 301a-301d may be selected. For example, the interface illustrated in FIG. 2 may be presented and the "ALL" radio button 206 may be selected. In some embodiments, less than all partitions may be selected.

A subsequence for stopping the four partitions 301a-301d may be implemented by at least one SP at blocks 304a-304d. In some embodiments, one or more subsequences may be combined to create a combined subsequence that is implemented on at least one SP in parallel. For example, the subsequence for stopping the four partitions 301a-301d may be combined with a subsequence for deactivating the four partitions 301a-301d to create a combined stop and deactivate subsequence. As shown in FIG. 3, at blocks 304a-304d the combined stop and deactivate subsequence may be implemented to stop and deactivate the four partitions 301a-301d.

According to an embodiment, the SPs implementing the DR sequence may also mount boot tapes in parallel with a subsequence. For example, as illustrated in the embodiment of FIG. 3, at block 305a boot tapes may be mounted in parallel with the stopping and deactivating of the four partitions 301a-301d at blocks 304a-304d via automated virtual tape library (VTL) commands. In another embodiment, the SPs implementing the DR sequence may split Site Remote Data Facility (SRDF) volumes in parallel with a subsequence. For example, as illustrated in the embodiment of FIG. 3, at block 305b SRDF device groups may be split in parallel with the stopping and deactivating of the four partitions 301a-301d at blocks 304a-304d to make production data available to at least one DR site.

Bootstrapping a computer system, or "booting," may begin at the microcode (i.e. very lowest) level, wherein a portion of memory and processors work together with firmware to define an initial system boot environment. This microcode and other system boot information may be stored on tape or disk volumes designed for this specific purpose. Once this phase has been completed a small, simple boot OS is loaded and continues the boot process by bringing online additional memory, processors, and eventually persistent storage such as disk devices. Other system peripherals are brought online toward the end of the boot process. After a load point referred to as "Sys Fin," the boot process is complete and users may be given access to the system.

Symmetrix Remote Data Facility (SRDF), referred to above, may be a remote disk replication system. SRDF may allow customers to stream critical data either synchronously or asynchronously (for instance, over long distances) to a remote data center. SRDF may establish a "data mirror" to secure crucial data between the production data center and the remote backup data center. When a Disaster Recovery event is initiated, an SRDF "split" may break this mirror as part of the process of switching from the production to DR site.

According to the embodiment of FIG. 3, block 306 is a sync point. At a sync point, the completion of all operations, such as those performed at blocks 304a-304d and 305a-305b, may be required before the DR sequence 300 proceeds.

When all operations required to be completed by the sync point at block 306 have completed, the DR sequence may proceed. In one embodiment, the DR sequence may proceed by performing further operations on all the partitions 301a-301d that were stopped and deactivated at blocks 304a-304d. In another embodiment, the DR sequence may proceed by performing further operations on less than all the partitions 301a-301d that were stopped and deactivated at blocks 304a-304d. For example, the embodiment illustrated in FIG. 3 shows that at blocks 308a-308c, a combined subsequence including a subsequence for activating a partition and a subsequence for starting a partition may be implemented on one or more SPs to activate and start partitions 301a-301c.

According to the embodiment of FIG. 3, block 310 is another sync point. In some embodiments, upon the DR sequence 300 reaching block 310, the partitions activated and started, such as at blocks 308a-308c, may be configured for production usage. When not all partitions initially stopped and deactivated have been activated and started in a production configuration, further input may be provided to activate and start all the partitions in a production configuration. For example, in some embodiments, some partitions, such as partition 301d in FIG. 3, may not be activated and started in a production configuration so that tests may be performed on the partition.

When a determination is made, either automatically by a processing device or manually by an administrator, that the remaining inactivated and not started partitions may be activated and started, then the combined activation and starting subsequence may be implemented again so that all partitions 301a-301d are activated and started in a production configuration. For example, according to the embodiment illustrated in FIG. 3, at block 312 an interface for receiving input may be presented and all four partitions 301a-301d may be selected for activation and starting. At blocks 314a-314d, a combined subsequence including a subsequence for activating a partition and a subsequence for starting a partition may be implemented on one or more SPs to activate and start partitions 301a-301d. Upon the DR sequence 300 reaching block 316, the partitions activated and started, such as at blocks 314a-314d, may be configured for production usage, indicating that the partitions 301a-301d have been successfully repurposed from a first configuration to a production configuration.

Figure 4:
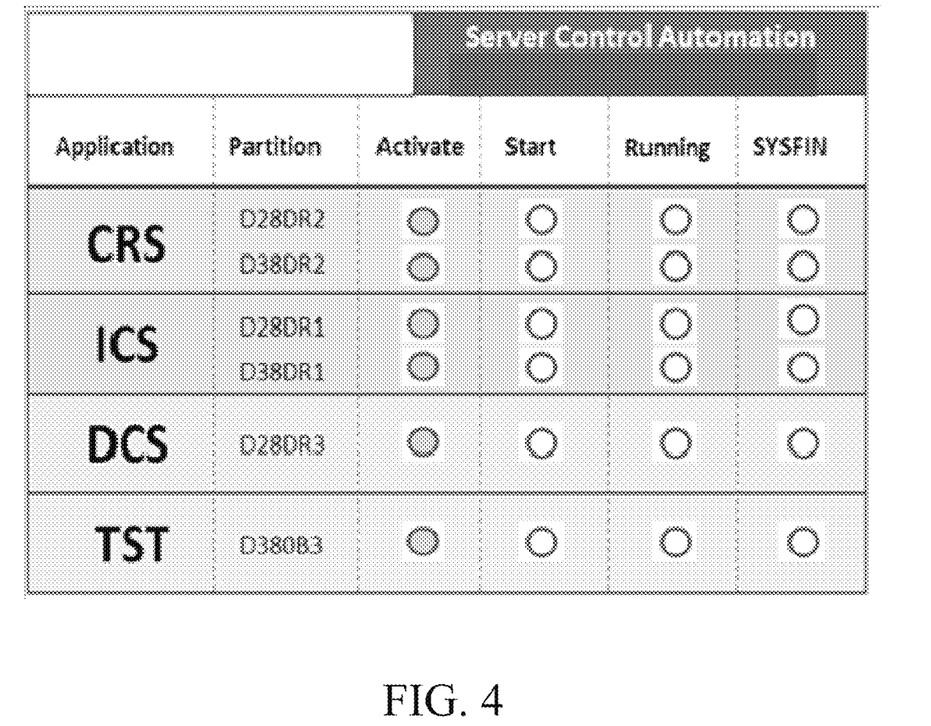
FIG. 4 is a screen shot illustrating the status of the DR sequence according to one embodiment of the disclosure.
Figure 5:
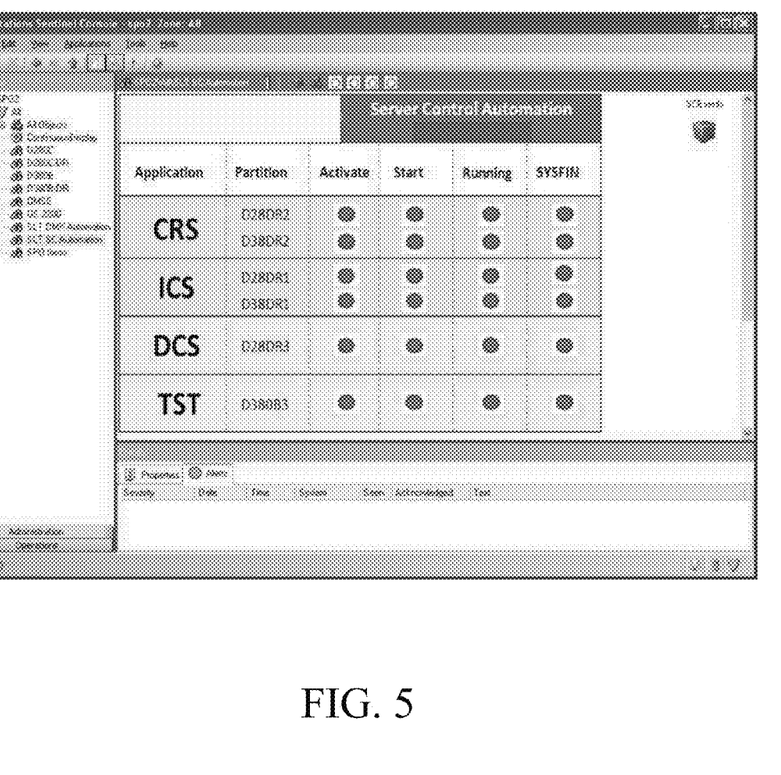
FIG. 5 is another screen shot illustrating the status of the DR sequence according to one embodiment of the disclosure.

In some embodiments, the status of the DR sequence may be tracked graphically. For example, FIG. 4 is a screen shot illustrating the status of the DR sequence according to one embodiment of the disclosure. The screen shot illustrated in FIG. 4 indicates that all application partitions on which SPs are implementing the DR sequence are in the activation phase of the DR sequence and that all partitions are being activated in parallel. FIG. 5 is another screen shot illustrating the status of the DR sequence according to one embodiment of the disclosure. In particular, the screen shot illustrated in FIG. 5 shows that the DR sequence implemented using a multi-threaded SCA on multiple SPs has completed, and therefore all partitions have been successfully repurposed for production usage.

The servers, processors, interfaces, and communication systems described above may include the servers, processors, interfaces, and communication systems described below with respect to FIGS. 6-8. For example, according to one embodiment, each of the servers and processors disclosed above may be configured similarly to the server 602 of FIG. 6 and central processing unit ("CPU") 702 of FIG. 7, and the communication system over which the DR sequence is initiated may be configured similarly to the network 608 of FIG. 6. In another embodiment, the interface disclosed above may be user interface 610 of FIG. 6 or interface 806 of FIG. 8. While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details or interrelationships between embodiments.

Figure 6:
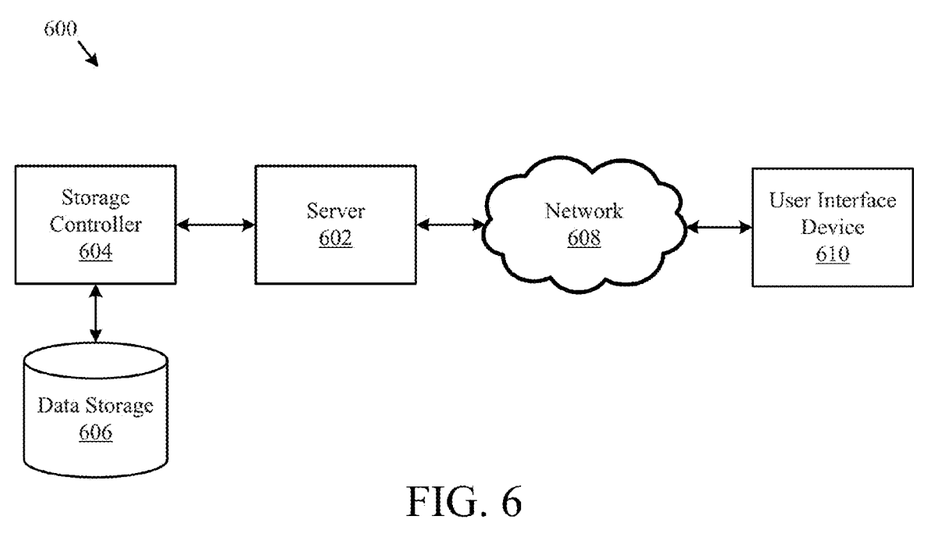
FIG. 6 is a block diagram illustrating a computer network according to one embodiment of the disclosure.

FIG. 6 illustrates a computer network 600 for multi-threaded SCA according to one embodiment of the disclosure. The system 600 may include a server 602, a data storage device 606, a network 608, and a user interface device 610. The server 602 may also be a hypervisor-based system executing one or more guest partitions hosting operating systems with modules having server configuration information. In a further embodiment, the system 600 may include a storage controller 604, or a storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other mobile communication device having access to the network 608. In a further embodiment, the user interface device 610 may access the Internet or other wide area or local area network to access a web application or web service hosted by the server 602 and may provide a user interface for enabling a user to enter or receive information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 7:
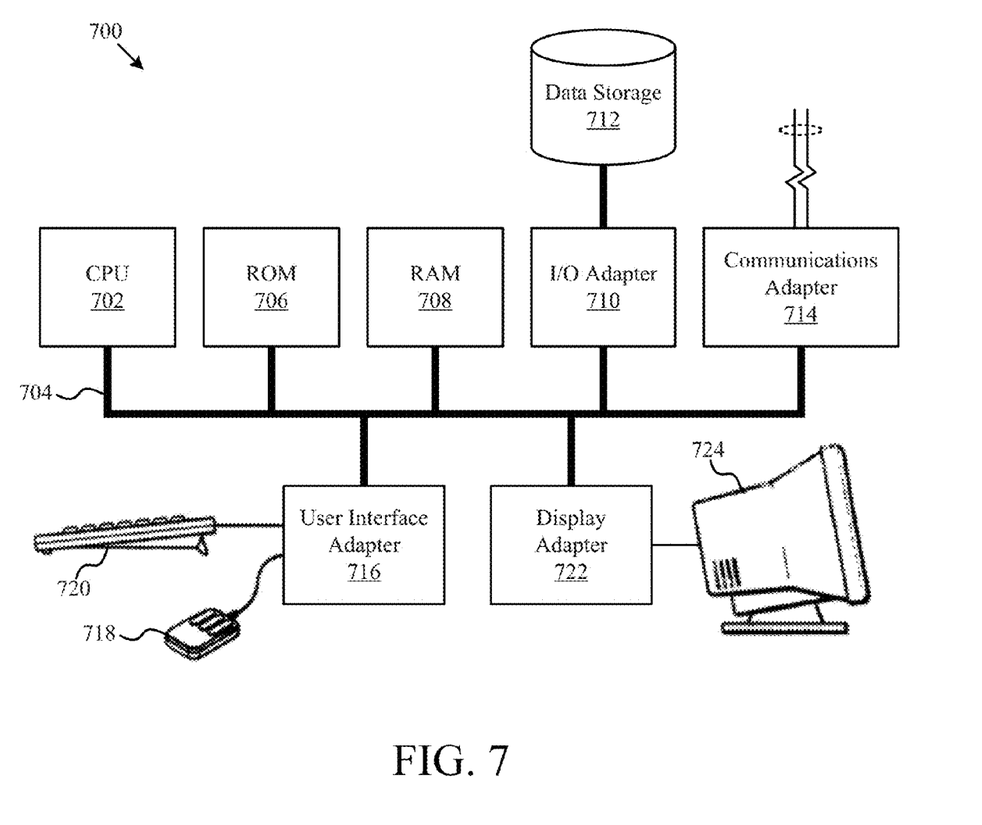
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions, either in native or non-native format, according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data, and both the RAM 708 and the ROM 706 may be randomly accessed.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be physical and/or logical.

The applications of the present disclosure are not limited to the architecture of computer system 700. Rather the computer system 700 is provided as an example of one type of computing device that may be adapted to perform the functions of the server 602 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 700 may be virtualized for access by multiple users and/or applications.

Figure 8A:
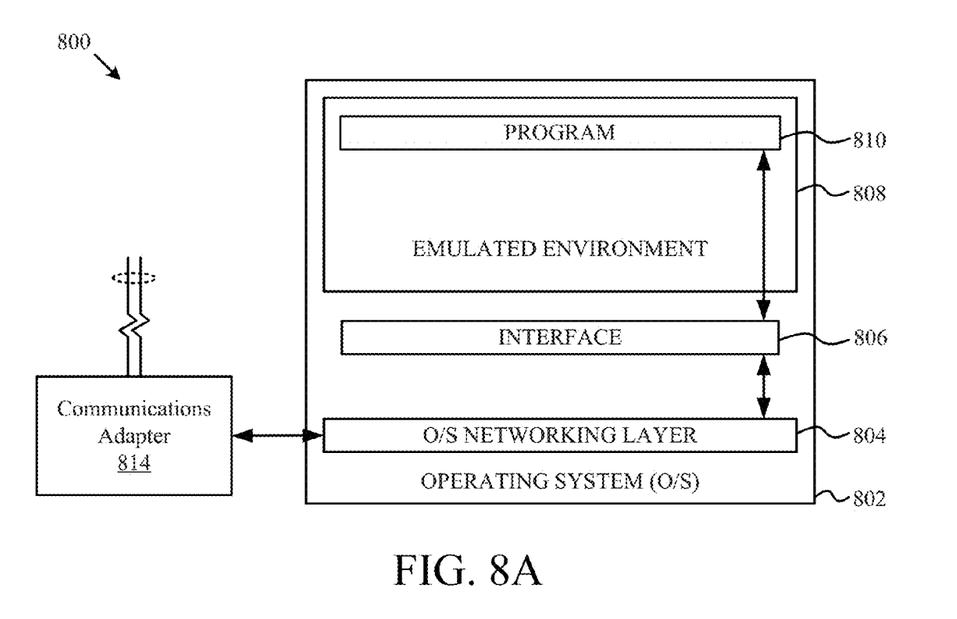
FIG. 8A is a block diagram illustrating a server hosting an emulated software environment for virtualization according to one embodiment of the disclosure.

FIG. 8A is a block diagram illustrating a server hosting an emulated software environment for virtualization according to one embodiment of the disclosure. An operating system 802 executing on a server includes drivers for accessing hardware components, such as a networking layer 804 for accessing the communications adapter 814. The operating system 802 may be, for example, Linux or Windows. An emulated environment 808 in the operating system 802 executes a program 810, such as Communications Platform (CPComm) or Communications Platform for Open Systems (CPCommOS). The program 810 accesses the networking layer 804 of the operating system 802 through a non-emulated interface 806, such as extended network input output processor (XNIOP). The non-emulated interface 806 translates requests from the program 810 executing in the emulated environment 808 for the networking layer 804 of the operating system 802.

Figure 8B:
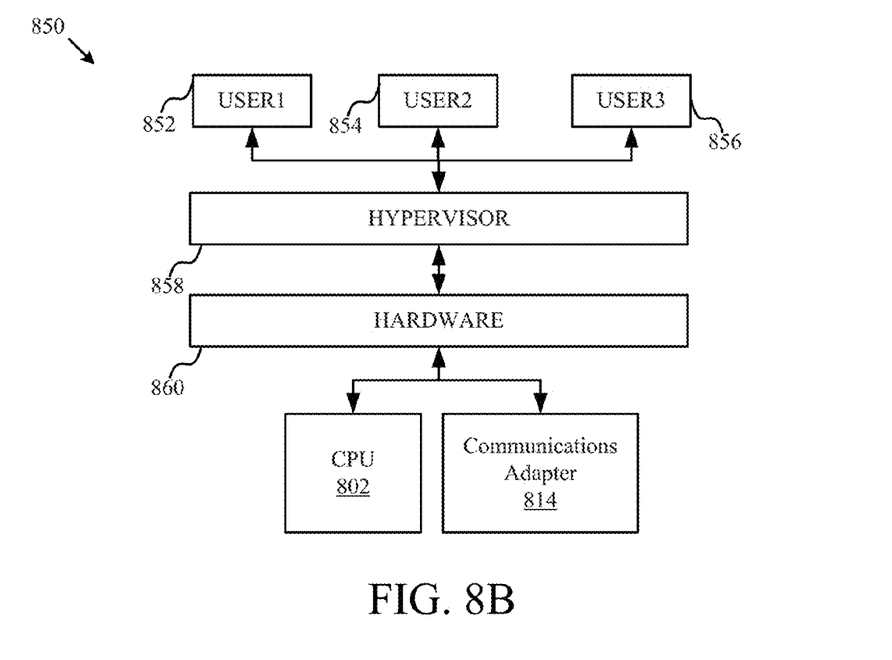
FIG. 8B is a block diagram illustrating a server hosting an emulated hardware environment according to one embodiment of the disclosure.

In another example, hardware in a computer system may be virtualized through a hypervisor. FIG. 8B is a block diagram illustrating a server hosting an emulated hardware environment according to one embodiment of the disclosure. Users 852, 854, 856 may access the hardware 860 through a hypervisor 858. The hypervisor 858 may be integrated with the hardware 860 to provide virtualization of the hardware 860 without an operating system, such as in the configuration illustrated in FIG. 8A. The hypervisor 858 may provide access to the hardware 860, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   initiating a disaster recovery sequence on two or more processors, wherein the disaster recovery sequence comprises a plurality of subsequences;
   implementing the disaster recovery sequence on the two or more processors in parallel, wherein one or more subsequences of the disaster recovery sequence are implemented on the two or more processors in parallel;
   performing a first subsequence for stopping a partition;
   performing a second subsequence for deactivating a partition;
   performing a third subsequence for activating a partition;
   performing a fourth subsequence for starting a partition;
   performing a fifth subsequence for booting a partition; and
   implementing a subsequence for mounting boot tapes in parallel using an automated virtual tape library; and
   implementing a subsequence for splitting Site Remote Data Facility volumes in parallel;
   wherein the step of implementing the disaster recovery sequence comprises repurposing at least one server partition from a first configuration to a second configuration upon completion of the disaster recovery sequence; and
   wherein one or more subsequences are combined to create a combined subsequence that is implemented on the two or more processors in parallel.

2. The method of claim 1, wherein the first configuration comprises at least one of a development configuration and a testing configuration and the second configuration comprises a production configuration.

3. The method of claim 1, further comprising tracking the status of the disaster recovery sequence graphically.

4. The method of claim 1, further comprising receiving input at an interface to initiate the disaster recovery sequence.

5. A computer program product, comprising:
   a non-transitory computer-readable medium comprising code to perform the steps of:
   initiating a disaster recovery sequence on two or more processors, wherein the disaster recovery sequence comprises a plurality of subsequences;
   implementing the disaster recovery sequence on the two or more processors in parallel, wherein one or more subsequences of the disaster recovery sequence are implemented on the two or more processors in parallel;
   performing a first subsequence for stopping a partition;
   performing a second subsequence for deactivating a partition;
   performing a third subsequence for activating a partition;
   performing a fourth subsequence for starting a partition; and
   performing a fifth subsequence for booting a partition; and
   implementing a subsequence for mounting boot tapes in parallel using an automated virtual library; and
   implementing a subsequence for splitting Site Remote Data Facility volumes in parallel;
   wherein the step of implementing the disaster recovery sequence comprises repurposing at least one server partition from a first configuration to a second configuration upon completion of the disaster recovery sequence; and
   wherein one or more subsequences are combined to create a combined subsequence that is implemented on the two or more processors in parallel.

6. The computer program product of claim 5, wherein the first configuration comprises at least one of a development configuration and a testing configuration and the second configuration comprises a production configuration.

7. The computer program product of claim 5, wherein the medium further comprises code to perform the step of tracking the status of the disaster recovery sequence graphically.

8. The computer program product of claim 5, wherein the medium further comprises code to perform the step of receiving input at an interface to initiate the disaster recovery sequence.

9. An apparatus, comprising:
a memory; and
a processor coupled to the memory, the processor configured to execute the steps of:
 initiating a disaster recovery sequence on two or more processors, wherein the disaster recovery sequence comprises a plurality of subsequences;
 implementing the disaster recovery sequence on the two or more processors in parallel, wherein one or more subsequences of the disaster recovery sequence are implemented on the two or more processors in parallel;
 performing a first subsequence for stopping a partition;
 performing a second subsequence for deactivating a partition;
 performing a third subsequence for activating a partition;
 performing a fourth subsequence for starting a partition; and
 performing a fifth subsequence for booting a partition; and
 implementing a subsequence for mounting boot tapes in parallel using an automated virtual tape library; and
 implementing a subsequence for splitting Site Remote Data Facility volumes in parallel;
 wherein the step of implementing disaster recovery sequence comprises repurposing at least one server partition from a first configuration to a second configuration upon completion of the disaster recovery sequence; and
 wherein one or more subsequences are combined to create a combined subsequence that is implemented on the two or more processors in parallel.

10. The apparatus of claim 9, wherein the first configuration comprises at least one of a development configuration and a testing configuration and the second configuration comprises a production configuration.

11. The apparatus of claim 9, wherein the processor is further configured to perform the steps of:
 tracking the status of the disaster recovery sequence graphically; and
 receiving input at an interface to initiate the disaster recovery sequence.

* * * * *